Oct. 22, 1968  S. S. HIGLEY  3,406,811
INSULATED LUNCH BOX
Filed Nov. 1, 1966
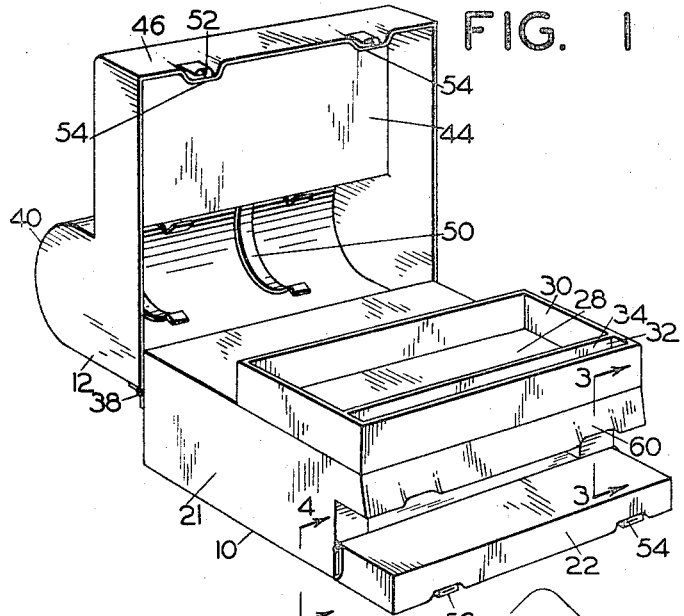
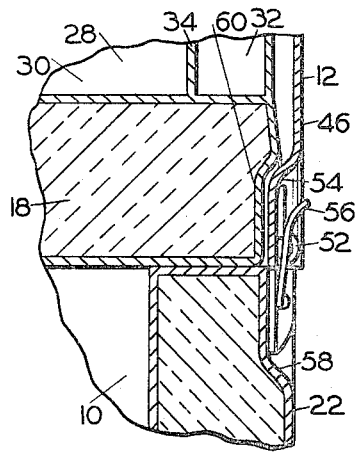
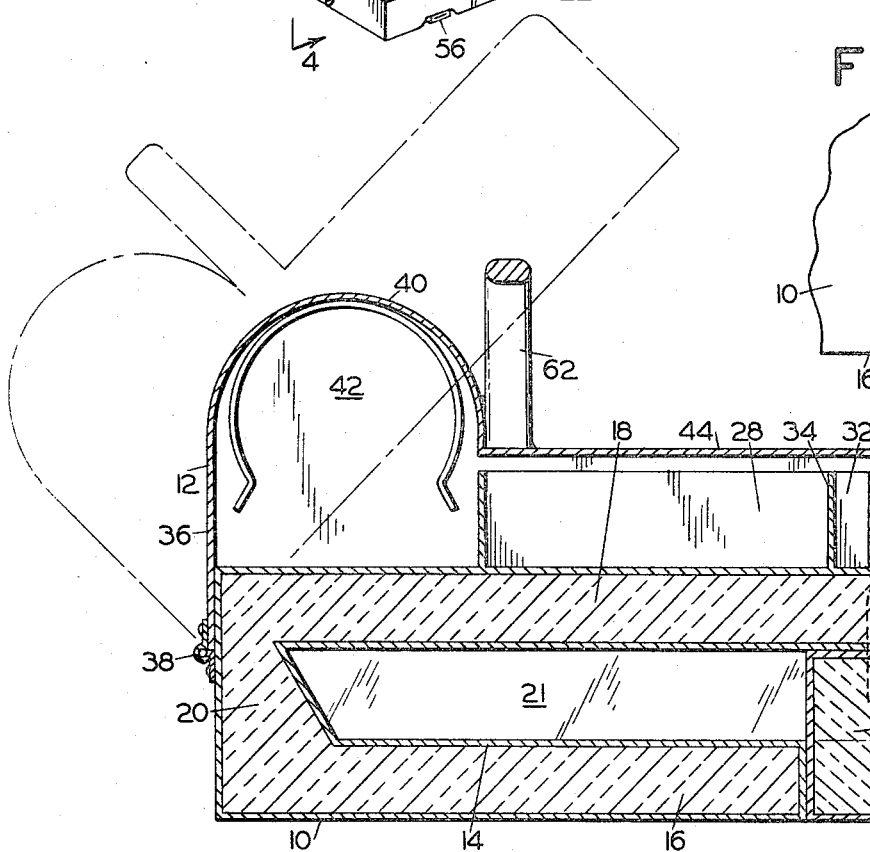
INVENTOR.
SANDRA S. HIGLEY
BY Eugene M. Eckelman
ATTORNEY

United States Patent Office 3,406,811
Patented Oct. 22, 1968

3,406,811
INSULATED LUNCH BOX
Sandra S. Higley, 1299 NE. 17th St.,
Hillsboro, Oreg. 97123
Filed Nov. 1, 1966, Ser. No. 591,183
2 Claims. (Cl. 206—4)

ABSTRACT OF THE DISCLOSURE

The lunch box has a lower compartment defined therearound by thickened insulated walls. The front wall of the lower compartment is hingedly attached to the lunch box to swing out and provide front loading. The hinge connection between the front wall and the lunch box comprises a guideway and pin arrangement whereby the front wall in addition to being hingedly movable between open and closed positions is also slidable in a direction parallel to the front surface of the lunch box so that when the front wall is open its lower surface will be in the same plane as the bottom of the lunch box. The lunch box also has a top compartment and a hinged lid which closes the top compartment and which also has a thermos bottle compartment. The top compartment has an auxiliary compartment, and with the arrangement of compartments it is intended that the top compartment hold sandwiches and the like, the auxiliary compartment holds silverware and the like, and the lower compartment which is insulated is intended to keep articles warm. The lid of the lunch box has a common latch with the hinged front wall of the insulated compartment.

---

This invention relates to lunch boxes and more particularly pertains to new and useful improvements in insulated type lunch boxes.

A primary objective of the present invention is to provide a lunch box having a novel arrangement of compartments one of which is insulated for keeping lunch articles hot or cold.

A more particular object is to provide a lunch box which has a bottom insulated compartment facilitating the carrying and keeping warm of flat lunch articles such as TV dinners.

Another object is to provide a lunch box in which the compartments comprise a bottom insulated compartment with a front opening lid, an upper, non-insulated compartment which is open at the top, and a compartment in the lid for holding a Thermos bottle.

Still another object is to provide an insulated lunch box which employs a lower insulated compartment having a front opening and a front closure for such opening which is connected such that in an open position thereof it is arranged to lie in a plane forming an extension of the bottom wall of the lower compartment.

Additional objects and advantages will become apparent from the following description taken in connection with the accompanying drawings which illustrate a preferred form of the device.

In the drawings:

FIGURE 1 is a prespective view of the lunch box of the present invention in open condition;

FIGURE 2 is a cross sectional view of the lunch box in closed condition and showing an open position of the lid and a front cover in phantom lines;

FIGURE 3 is an enlarged, fragmentary sectional view taken in the line 3—3 of FIGURE 1; and FIGURE 4 is an enlarged fragmentary elevational view taken on the line 4—4 of FIGURE 1.

Referring in particular to the drawings, the lunch box of the present invention comprises essentially two parts, namely, a body member or bottom portion 10 and a lid member or upper portion 12. The body member 10 has a compartment 14 which as best seen in FIGURE 2 is defined in part by an insulated bottom wall 16, an insulated top wall 18, an insulated rear wall 20, and insulated side walls 21. The dimensions of the body member 10 are such that the compartment 14 is rather deep from front to rear. More particularly, the dimensions are such that a conventional, flat, tray-like TV dinner may be received therein. The forward end of the compartment 14 is closed by a front wall 22 comprising a cover hingedly attached to the body member 10. The hinge connection is shown in FIGURES 1 and 4 and comprises an arrangement whereby the cover can be pivoted between its closed position of FIGURE 2 to its open position of FIGURE 1 and in its open position is caused to lie flat with its front surface coextensive with the bottom surface of the lunch box. For this purpose, the hinge comprises pins 24 projecting outwardly from each side at the upper, rearward end of the front wall 22 and slidably engaged in guideways 26 of the shape shown in FIGURE 4, whereby when the cover 22 is closed from the position of FIGURE 4, the pins 24 slide down in the guideways 26 and the bottom surface of the front cover 22 will be coextensive with the bottom surface of the lunch box. Conversely, when the cover is opened the rearward end thereof moves upwardly to the position of FIGURE 4 wherein the front surface of the cover 22 is coextensive with the bottom surface of the lunch box. By means of this structure, the lunch box can be laid on the lap or other supporting surface and have a flat engagement throughout its bottom plane with such supporting surface.

As best seen in FIGURE 2, the bottom wall 16 terminates short of the top wall 18 at the forward end of the body member, and the front cover 22 is thus inset under the top wall whereby the front surface thereof is substantially flush with the front surface of the top wall.

Extending upwardly from the top surface of top wall 18 is a compartment 28 having defining walls 30. Disposed at the forward end of compartment 28 is an auxiliary compartment 32. This latter compartment is formed by a partition wall 34, and is for silverware or the like.

The lid 12 has a cross-sectional shape as best shown in FIGURE 2, including a rear straight wall portion 36 which has a hinged connection 38 with the back wall of body member 10, an upper curved portion 40, forming a compartment 42 for a Thermos bottle, a top wall portion 44 which extends over the top of the compartment 28, and downwardly extending front and side walls 46, FIGURE 1. Compartment 42 contains two or more spring clips 50 for holding the Thermos.

The front wall 46 of the lid 12 has a pair of male latch members 52, FIGURE 3, disposed in depressions or recesses 54 and arranged for engagement by female latch members 56 mounted in depressions or recesses 58 in the front surface of the front wall 22. The front surface of wall 18 has depressions or recesses 60 to accommodate the depressions 54 in the lid 12 and thus allow substantial flush disposition of the forward portion of the lid with the bottom portion of the lunch box.

A handle member 62 is integrated with the lid 12 to carry the lunch box.

In the use of the present lunch box, articles to be kept warm are placed in compartment 14 and other lunch articles such as sandwiches are placed in the compartment 28. Silverware is placed in compartment 32. Compartment 14 of such dimension and shape as to hold the conventional flat TV dinners whereby such a dinner may be cooked at home and kept warm in the lunch box until lunch time. To open the lunch box the latch member 56 is released whereupon both the lid 12 and the front cover 22 are movable to the position shown in FIGURE 1.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A lunch box construction comprising
   (a) a body member,
   (b) a lid hingedly connected to said body member,
   (c) said body member having a compartment formed by thickened insulated top, bottom, front, rear and side walls,
   (d) said body member having a front surface and a bottom surface and said front wall having a front surface and a bottom surface,
   (e) hinge means hingedly connecting said front wall to said body member to provide front loading of said compartment,
   (f) said hinge means comprising interengaging pin means and an elongated guideway on respective ones of said body member and said front wall,
   (g) said guideway being parallel with the said front surface of the body member and being of a length approximating the thickness of said front wall,
   (h) said pins having rotative and slidable movement in said guideway whereby said front wall in addition to being hingedly movable between open and closed positions is also slidable in a parallel direction to said front surface of the body member to cause said front surface of said front wall to be coextensive with the bottom surface of the body member when said front wall is opened,
   (i) and means defining a top opening compartment on said top wall arranged to be covered by said lid.

2. The lunch box construction of claim 1 wherein the bottom wall of said insulated compartment terminates short of said top wall a distance substantially equal to the thickness of said front wall whereby the front surface of said front wall is flush with the front surface of said body member.

References Cited

UNITED STATES PATENTS

| | | | |
|---|---|---|---|
| 206,287 | 7/1879 | Will | 206—4 |
| 650,786 | 5/1900 | West. | |
| 2,256,935 | 9/1941 | Austin | 206—4 |
| 2,357,214 | 8/1944 | McDole | 220—38 X |
| 2,367,205 | 1/1945 | Cowen | 217—59 X |
| 2,457,043 | 12/1948 | Histand | 206—4 X |
| 2,839,654 | 6/1958 | Jones et al. | 206—4 X |
| 3,219,179 | 11/1965 | Tuccio | 206—4 |

MARTHA L. RICE, *Primary Examiner.*